(12) United States Patent
Brizzi

(10) Patent No.: US 9,517,912 B2
(45) Date of Patent: Dec. 13, 2016

(54) METHOD FOR COLLECTING SAMPLES OF FLAT OBJECTS IN A PACKAGING MACHINE AND PACKAGING MACHINE FOR IMPLEMENTING SAID METHOD

(71) Applicant: Nicolas Brizzi, Martigny (CH)

(72) Inventor: Nicolas Brizzi, Martigny (CH)

(73) Assignee: BOBST MEX SA (CH)

( * ) Notice: Subject to any disclaimer, the term of this patent is extended or adjusted under 35 U.S.C. 154(b) by 0 days.

(21) Appl. No.: 14/375,538

(22) PCT Filed: Jan. 29, 2013

(86) PCT No.: PCT/EP2013/000248
§ 371 (c)(1),
(2) Date: Jul. 30, 2014

(87) PCT Pub. No.: WO2013/113488
PCT Pub. Date: Aug. 8, 2013

(65) Prior Publication Data
US 2014/0353118 A1  Dec. 4, 2014

(30) Foreign Application Priority Data

Feb. 3, 2012 (EP) .................................... 12000737

(51) Int. Cl.
*B65H 31/30* (2006.01)
*B65G 47/46* (2006.01)
(Continued)

(52) U.S. Cl.
CPC ........... *B65H 31/3036* (2013.01); *B65G 47/46* (2013.01); *B65G 47/52* (2013.01);
(Continued)

(58) Field of Classification Search
CPC ......... B65H 33/14; B65H 29/62; B65H 29/22; B65H 31/3036
See application file for complete search history.

(56) References Cited

U.S. PATENT DOCUMENTS 2,484,196 A * 10/1949 Turrall ................... B65H 33/14
198/442
4,045,944 A * 9/1977 Giori ...................... B65H 29/62
198/447
(Continued)

FOREIGN PATENT DOCUMENTS

| EP | 1 215 150 A2 | 6/2002 |
|---|---|---|
| EP | 1 541 512 A1 | 6/2005 |
| JP | S 49-105606 A | 10/1974 |

OTHER PUBLICATIONS

International Search Report dated May 14, 2013 issued in corresponding International patent application No. PCT/EP2013/000248.

*Primary Examiner* — Thomas Randazzo
(74) *Attorney, Agent, or Firm* — Ostrolenk Faber LLP

(57) ABSTRACT

A method for collecting samples in a machine for packaging flat objects, the packaging machine has a counting device and a separation device for forming a succession of batches, and an assembly device for forming a succession of packs. The method of collection includes stages of: forming a sample batch composed of a given number of flat objects with the help of the counting and separation devices, collecting the sample batch by the assembly device, and transferring the sample batch to a dedicated retrieval area with the assembly device.

3 Claims, 2 Drawing Sheets

(51) Int. Cl.
  *B65H 29/22* (2006.01)
  *B65H 33/12* (2006.01)
  *B65H 33/14* (2006.01)
  *B65H 43/04* (2006.01)
  *B65G 47/52* (2006.01)

(52) U.S. Cl.
  CPC ............ *B65H 29/22* (2013.01); *B65H 33/12* (2013.01); *B65H 33/14* (2013.01); *B65H 43/04* (2013.01); *B65H 2301/5111* (2013.01); *B65H 2301/541* (2013.01); *B65H 2301/5421* (2013.01); *B65H 2511/512* (2013.01); *B65H 2513/10* (2013.01); *B65H 2513/51* (2013.01); *B65H 2555/31* (2013.01)

(56) References Cited

U.S. PATENT DOCUMENTS

| | | | | |
|---|---|---|---|---|
| 4,367,997 A * | 1/1983 | Schweingruber | ...... | B65H 29/66 198/408 |
| 4,746,004 A * | 5/1988 | Hess | ...... | B65H 29/66 198/418.9 |
| 4,838,747 A * | 6/1989 | Morisod | ...... | B65H 15/02 414/761 |
| 4,927,321 A * | 5/1990 | Lucas | ...... | B65G 57/035 414/788.9 |
| 5,096,371 A * | 3/1992 | Mojden | ...... | B65H 31/3045 221/11 |
| 5,493,104 A * | 2/1996 | Wilson | ...... | B65H 31/32 235/98 R |
| 5,705,020 A * | 1/1998 | Chiari | ...... | B31B 1/74 156/350 |
| 5,758,873 A * | 6/1998 | Faesser | ...... | B65H 5/02 270/58.29 |
| 6,438,925 B1 * | 8/2002 | Straub | ...... | B65B 5/108 53/244 |
| 6,783,317 B2 * | 8/2004 | Claeys | ...... | B65H 29/001 414/788.1 |
| 7,178,801 B2 * | 2/2007 | Kokubo | ...... | B65H 31/10 271/213 |
| 7,665,721 B2 * | 2/2010 | Palamides | ...... | B65H 29/6618 271/9.01 |
| 8,056,304 B2 * | 11/2011 | Brandhorst | ...... | B65B 35/54 198/417 |
| 8,167,530 B2 * | 5/2012 | Langlot | ...... | B65G 61/00 414/419 |
| 8,480,550 B2 * | 7/2013 | Taketsugu | ...... | B31B 1/74 493/12 |
| 8,583,279 B2 * | 11/2013 | Fecht | ...... | B65B 35/44 198/347.1 |
| 8,684,657 B2 * | 4/2014 | Pini | ...... | B31B 1/92 198/406 |
| 8,757,347 B2 * | 6/2014 | Heitplatz | ...... | B65G 11/203 193/25 A |
| 8,893,876 B2 * | 11/2014 | Morisod | ...... | B65H 29/6618 198/431 |
| 2003/0123962 A1 * | 7/2003 | Mikulic | ...... | B65G 59/023 414/403 |
| 2005/0095094 A1 * | 5/2005 | Maynard | ...... | B25J 5/02 414/280 |
| 2005/0280203 A1 * | 12/2005 | Ozcariz Eizaguirre | ...... | B65H 29/60 271/214 |
| 2006/0263196 A1 * | 11/2006 | Kietzmann | ...... | B65H 31/3045 414/794 |
| 2008/0124209 A1 * | 5/2008 | Carrigan | ...... | B65B 25/14 414/800 |

\* cited by examiner

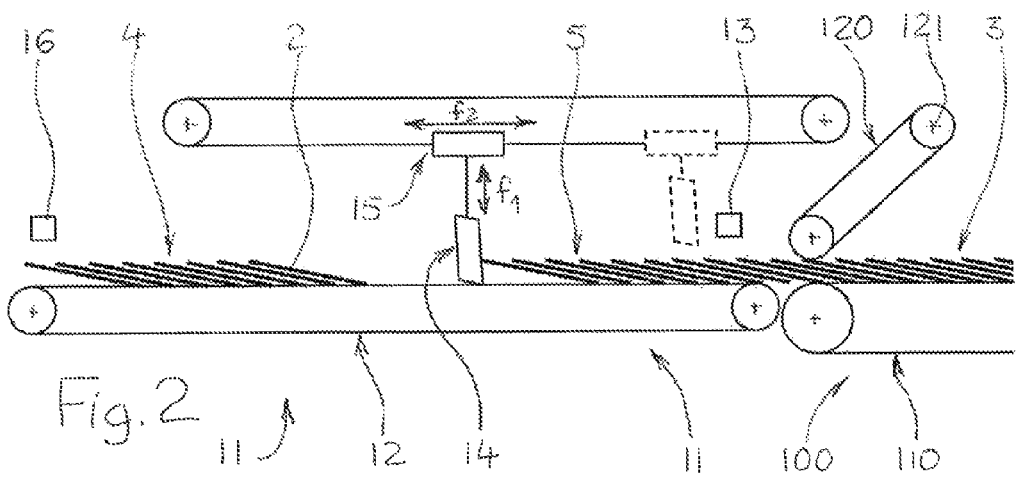
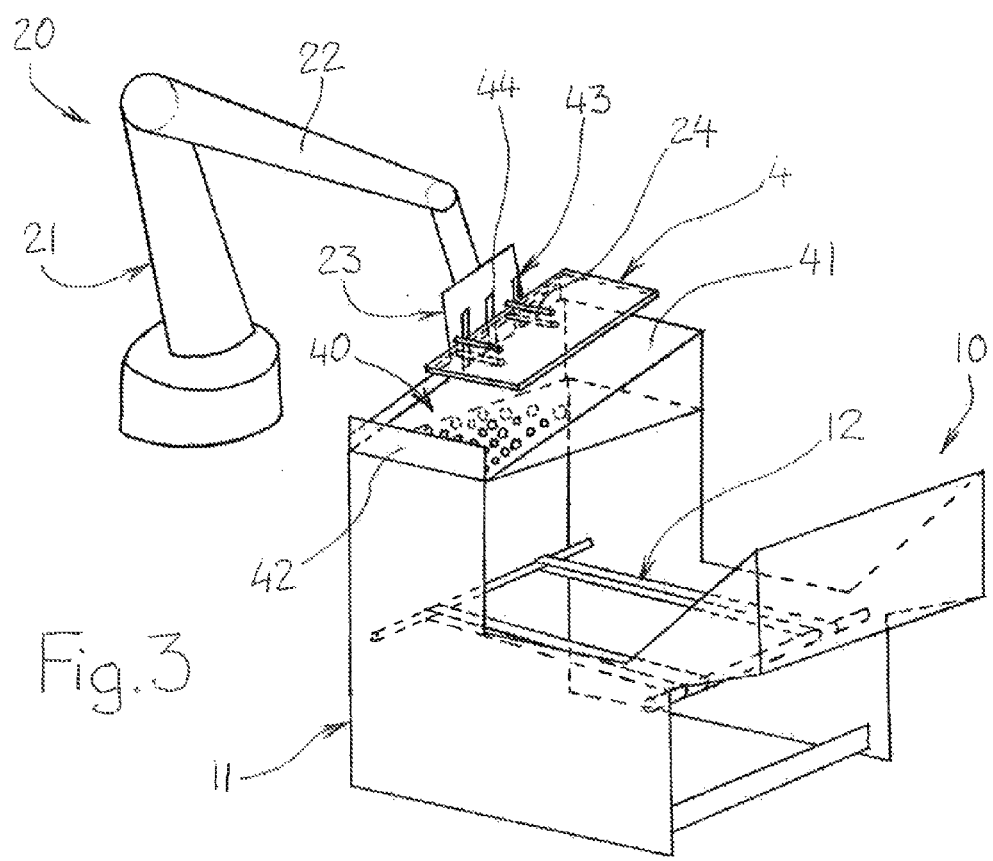

METHOD FOR COLLECTING SAMPLES OF FLAT OBJECTS IN A PACKAGING MACHINE AND PACKAGING MACHINE FOR IMPLEMENTING SAID METHOD

CROSS-REFERENCE TO RELATED APPLICATIONS

The present application is a 35 U.S.C. §§371 national phase conversion of PCT/EP2013/000248, filed Jan. 29, 2013, which claims priority of European Patent Application No. 12000737.2, filed Feb. 3, 2012, the contents of which are incorporated by reference herein. The PCT International Application was published in the French language.

TECHNICAL FIELD

The present invention relates to a method for permitting samples to be collected in a machine for packaging flat objects.

The invention likewise relates to a machine for packaging flat objects capable of implementing said method for collecting samples.

The invention finds a particularly advantageous, albeit not exclusive, application in the area of the manufacture of folding boxes made of corrugated board or of high-grammage solid board.

TECHNICAL BACKGROUND

In the packaging industry, the manufacture of folding boxes traditionally takes place in line, by folding and gluing blanks using a folder-gluer. Since the folding boxes are ultimately delivered in shingle form, they are generally packaged in the form of packs directly at the outfeed from the folder-gluer. Very often, these packs are also subjected to individual strapping with the intention of ensuring their stability, thereby facilitating their handling and/or their storage.

In order to perform such packing operations, the use of a particular type of packaging machine, namely a packing machine, is known. The latter is, in fact, capable not only of placing the folding boxes in packs, but also of binding together the folding boxes making up each pack.

Of the packing machines known from the prior art, it is possible to distinguish those which operate broadly in three stages. The machine starts by counting the boxes one by one, to enable separating them on a regular basis as soon as a precise number is reached, thereby creating a succession of batches of boxes. The machine then places them in packs, which involves stacking a reduced number of batches, generally two, in a more or less complicated manner. The packing is completed by strapping, in which the boxes of each pack are secured together by one or a plurality of ties. The strapped packs may then be palletized conveniently for handling and/or storage.

A combination of a folder-gluer and a packing machine has a disadvantage, of interfering with quality control, particularly for finished products. The nature of interlinking between these two types of machine is such that the possibility of collecting samples of finished products easily is in reality only available at the outfeed from the packing machine. Unfortunately, such an operation requires intervention of an operator, who must intervene manually in order to collect a pack and must then break each tie holding the boxes together, before extracting one or a plurality of samples from the stack. The operator is then also required to recycle the opened pack by topping it up, before strapping the pack again and then placing it back in circulation.

SUMMARY OF THE INVENTION

The technical problem to be overcome by the object of the present invention is to provide a method for collecting samples in a machine for packaging flat objects. The packaging machine comprises means for counting and separating flat objects for forming a succession of batches, with each batch comprised d of a set number of flat objects, and comprises assembly means for forming a succession of packs, each comprised of a particular assembly of batches. This apparatus and a method it performs is intended to permit problems associated with the prior art to be avoided by making true ease of implementation available.

According to the present invention, the method of collection includes the stages:
  forming a sample batch composed of a selected number of flat objects with the counting and separation means,
  collecting the sample batch with the assembly means, and
  transferring the sample batch with the assembly means to a dedicated retrieval area.

The invention has the advantage of being able to perform an automated sampling of finished products in the packaging machine, but without interfering with the packaging process per se. Automation makes it possible to dispense with tedious manual operations. However, it also imparts precision, rapidity and reliability to the collection operation.

The principle of the invention is to collect the samples by utilizing certain of principal component parts of the packaging machine, namely the counting and separation means, for isolating each sample, means of assembly for extracting the sample and then transferring it to an appropriate location. Such collecting does not require the use of specific means, however, but simply necessitates a different utilization of the packaging machine. This makes the invention easier to implement.

The invention is applicable to any packaging machine that is capable of placing flat objects in packs, the counting and separating the flat objects into batches, followed by the constitution and assembly of the batches of flat objects. The invention likewise relates to any packaging machine with the ability to perform any of a plurality of other supplementary operations, particularly after placing the objects into packs. More specifically, this may include a packer in which the packs are strapped/strung/banded immediately after their constitution, as in the illustrative embodiment described below. However, this can also include machines in which the packs are brought to a final stage ready for film wrapping and/or for being placed in a container.

According to one characterizing feature of the invention, the packaging machine functions directly downstream of the machine for manufacturing the flat objects. The method of collection then includes additional stages including:
  before forming of the sample batch, reducing the operating speed of the machine for manufacturing the flat objects,
  after collecting of the sample batch, increasing the speed of the manufacturing machine to return it to its initial operating speed.

It is known that, when a packaging machine is directly associated with a manufacturing machine, the packaging machine constitutes the limiting element for the operating speed of the system. This is particularly when a packaging machine is used for packaging flat objects of the folding box type originating from a folder-gluer. Thus, it is particularly appropriate to slow the manufacturing machine when the packaging machine must be used momentarily in order to perform a function other than packaging, namely collecting a sample. It follows that the manufacturing machine must then be speeded up to return to its normal operating speed. Such a speed up operation may be carried out concurrently, subsequently, at the stage of transferring the sample batch, or at the stage of depositing the sample batch.

The collection method is intended to perform the sampling operation with a view to application of a quality control process, with each sample batch being capable of being composed of one or a plurality of objects. Under this assumption, collection may be performed in a regular manner, that is every x objects, or may be performed randomly, or may be triggered on request.

The method of collection may also be utilized advantageously in order to cause ejection of waste in connection with a process involving the detection and elimination of noncompliant objects. In this case, collection is to take place only in the event of noncompliance and, of course, is to be performed solely on objects that have been identified as being noncompliant.

According to the invention, the method of collection includes additional stages of:
  detecting any noncompliant flat object upstream of the packaging machine,
  marking each noncompliant flat object so it can be later identified,
  identifying each noncompliant flat object at the infeed to the packaging machine,
  collecting each marked flat object in the form of a sample batch.

This characteristic thus relates to the particular application of ejection of waste and involves implementation to extract and remove any noncompliant object that is detected upstream of the packaging machine. The detection operation may be carried out either before or after completion of the manufacture of the flat object.

Where the flat objects are folding boxes originating from a folder-gluer, the detection should preferably be performed at the level of the blanks at a time when the blanks have not yet been folded and glued, in order to permit control of the integrity of the external surface of each box in one step. The reasons for noncompliance of objects are generally a lack of glue, insufficient quality of printing, or a folding error. Detection and marking are advantageously performed directly at the level of the folder-gluer.

In practice, detection can be performed by a sensor adapted to each type of defect to be detected. Marking, can for example be performed by spraying onto each noncompliant box a liquid substance that is visible only under UV light. The identification of each previously marked noncompliant box can be performed when it enters the packaging machine. Ejection of each marked box can be accomplished by simple collection, without interfering with the packaging process or damaging the sample.

The collection stage may consist advantageously of collecting all of the noncompliant flat objects in the same sample batch in a single operation.

The invention relates more generally to any packaging machine that is capable of implementing the method of collection described previously.

The present invention relates in addition to the characterizing features that will become apparent in the course of the following description. These features may be considered in isolation or according to all their possible technical combinations.

The description is a non-restrictive example of the invention and of how it may be realized. The description is provided with reference to the accompanying drawings, in which:

BRIEF DESCRIPTION OF THE DRAWINGS

FIG. 2 is a highly schematic illustration of counting and separation module of the packing machine in FIG. 1.

FIG. 3 is a perspective view from above which shows interaction between the assembly module and the counting and separation module at the end of the method for collecting a sample.

DESCRIPTION OF EMBODIMENTS

For clarity, the same elements are designated by identical references. Likewise, only elements that are essential for the understanding the invention are schematically represented here, without consideration for their scale.

Figure 1:
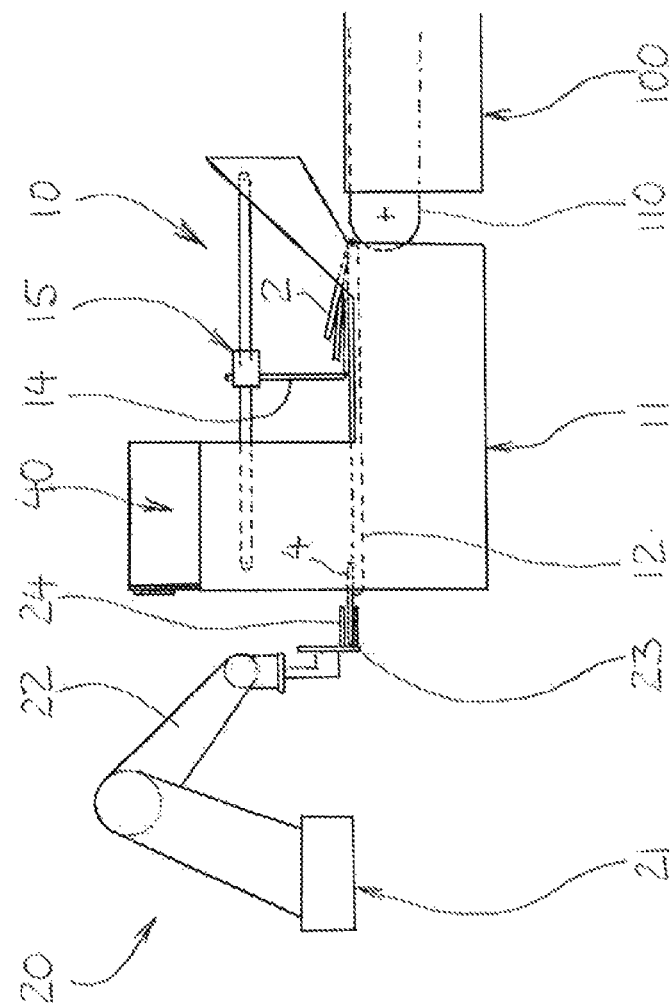
FIG. 1 represents a machine for packing flat objects which is comprised of a counting and separation module, an assembly module and a strapping module, and which together implement the method for collecting samples according to the invention.
Figure 1:
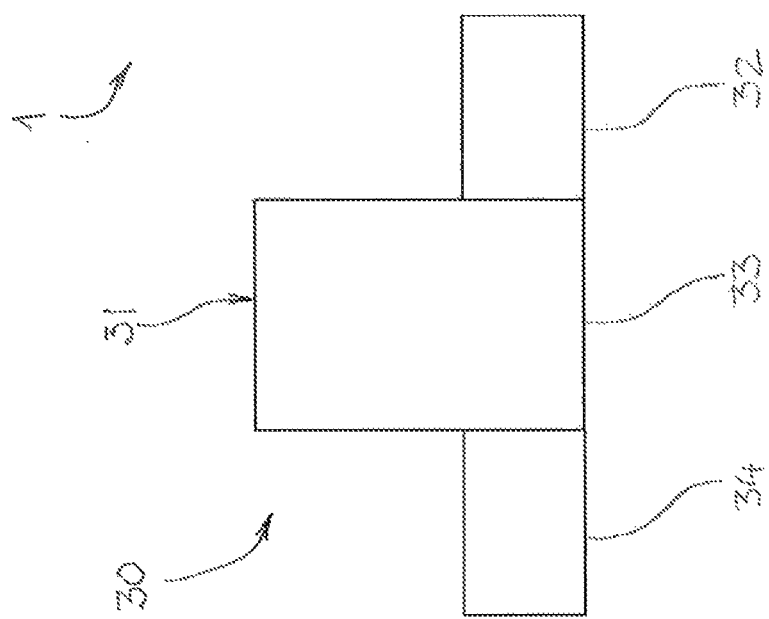

FIG. 1 illustrates a packaging machine 1 for packing flat objects 2 of the folding box type. The machine 1 transforms a continuous flow of folding boxes 2 arriving from a folder-gluer 100 into a succession of strapped packs that are ready to be handled or stocked. The machine 1 is positioned directly downstream of the folder-gluer 100. The machine 1 has a modular structure in which counting and separation means 10, assembly means 20 and strapping means 30 are arranged respectively as interdependent modules 11, 21, 31.

The counting and separation module 11 is more specifically responsible for forming a succession of batches 4, 5, (FIG. 7) each comprised of a selected number of boxes 2. In practical terms, this involves counting the boxes 2 one by one and separating them on a regular basis into successive series of batches as soon as a specifically defined number of boxes is reached, thereby creating a sequence of batches of boxes 4, 5 that are disjointed one from the other.

The assembly module 21, for its part, creates a succession of packs, each constituted by a predetermined stack of batches of boxes 4, 5. This is obtained by collecting each pack of boxes 4, 5 individually at the outfeed from the counting and separation module 11, transferring it to the infeed to the strapping module 31, and stacking it in a more or less complicated manner together with a reduced number of its counterparts with a view to forming a pack.

The strapping module 31 of the packaging machine 1, more accurately a packing machine, forms a succession of strapped packs, in which stacked boxes 2 are attached together. Strapping of each pack may be by means of one or a plurality of ties, of a nature and in positions in any desired manner.

In this embodiment, for example, the counting and separation module 11 has a relatively conventional structure. Its kinematics of operation are illustrated in FIG. 2.

This highly schematic representation shows that the module 11 is supplied directly by the folder-gluer 100. The folding boxes 2 are, in effect, brought in the form of a layer to the infeed into the counting and separation module 11 by the reception conveyor 110 of the folder-gluer 100, which rotates at a given speed v1.

An upper conveyor 120, likewise rotating at a speed v1, is installed above the downstream extremity of the reception conveyor 110. Pivotably mounted in relation to a transverse axis 121 and driven downwards continually by gravity in a swinging manner, this upper conveyor 120 interacts with the reception conveyor 110 in order to channel the layer 3 to the outfeed from the folder-gluer 100, while evening out the relative positioning of the different boxes 2 of which it is composed.

When the boxes 2 arrive at the infeed to the counting and separation module 11, they are conveyed by a lower transport conveyor 12 which is travelling at a speed v1 at that point in time. A conventional laser cell 13 positioned immediately above the layer then counts the boxes 2 as the latter pass by at a speed v1, for constituting a pack 4, 5.

Positioned slightly downstream of the laser cell 13 is a separator 14, which divides the layer 3 into a succession of batches 4, 5. The separator 14 is initially movably mounted for vertical translation (arrow f1) to be capable, on the one hand, of descending towards the layer 3 until it eventually becomes interleaved between the final box of the pack 4, of which the counting is already complete, and the first box of the new pack 5 that is being counted. However, the separator 14 is also movably mounted in horizontal translation (arrow f2), parallel to the direction of displacement of the boxes to accompany displacement of the pack 5 as it is being counted and for retaining the pack 5 during removal of the preceding pack 4.

The separator 14 is connected to a drive system 15, which is programmed to cause the separator to advance at a speed v1 during the entire period of counting the new pack 5. The separator 14 is thus able to retain the pack 5 if passage of the transport conveyor 12 becomes speeded up. The removal of the complete pack 4 in effect takes place by increasing the speed of the transport conveyor 12 momentarily up to a speed v2, which is significantly higher than v1. The separator 14, which is still present in front of the pack 5 in the course of being counted, acts as a mobile abutment, which allows the pack 5 to maintain a speed v1 in spite of the fact that the pack 5 is resting on a conveyor 12 rotating at a speed v2.

A sensor 16 installed above the outfeed from the transport conveyor 12 detects the end of the passage of the complete pack 4. Once its removal is confirmed, the transport conveyor 12 returns to a speed v1. At the same time, the drive system 15 raises the separator 14, to return it rapidly to its initial position, and then to lower it once more until it is interleaved between the following two batches 4, 5 to be separated.

As can be appreciated from FIGS. 1 and 3, for handling each pack of boxes 2, the assembly module 21 uses a robotic arm 22, which at its free extremity a fork gripper 23 is articulated.

Regardless of whether the boxes 2 exiting from the counting and separation module 11 constitute either a standard pack destined to be packed or a sample batch intended to be isolated for being inspected, they are collected by positioning the gripper 23 directly at the outfeed from the transport conveyor 12, in accordance with FIG. 1. In practical terms, all the boxes 2 making up the pack 4 will be gathered together between the forks 24 of the gripper 23 by being stacked vertically one after the other as the said gripper 23 is lowered.

Once the boxes 2 have been gripped fully by the fork gripper 23, the destination of the pack 4, 5 will vary depending on its nature. In effect, when the boxes 2 are intended to be transferred to the infeed to the strapping module 31 in the case of a standard batch, as a sample batch, they are intended in this case to be transported as far as a dedicated retrieval area 40 in FIG. 3.

FIG. 1, furthermore, shows that, in this illustrative embodiment, the strapping module 31 is principally comprised of an assembly table 32, on which the batches of standard boxes are stacked in packs, a strapping machine 33 responsible for connecting together the boxes making up each pack, as well as a receiving table 34, on which the strapped packs are made available.

According to one feature of the invention, the packaging machine 1 includes a retrieval area 40 which is intended to receive each collected pack of samples. This is a dedicated location, which is remote from the path according to which the boxes 2 pass inside the packaging machine 1 in order to be accessible to an operator or some other additional mechanical device.

As can be appreciated clearly in FIG. 3, this retrieval area 40 is arranged at the level of the packaging machine 1. It is in effect situated at the level of the counting and separation means 10, and in this particular case above the counting and separation module 11. Although such proximity is intended above all to preserve the compactness of the packaging machine 1, it also permits the optimization of the operational safety of the latter, for example by restricting the amplitude of displacement of the robotic arm 22, as shown in the illustrative embodiment in FIGS. 1 to 3.

In a particularly advantageous manner, the retrieval area 40 is provided with a receiving plane 41 which is inclined with respect to the horizontal. This characterizing feature makes use of gravity in order to bring about an automatic displacement of the sample batch 4, 5 towards the lowest part of the retrieval area 40. The ultimate objective is to guarantee that the sample batch 4, 5 is always accessible at the same place, regardless of the format or the form of the boxes by which it is composed. This additionally provides the opportunity to place the operator in safety when he approaches to remove a sample, by keeping him at a distance from any moving device of the packaging machine 1.

Preferably, the inclination of the receiving plane 41 is oriented towards the operator's side, that is to say on the side of the counting and separation module 11 where the operator of the packaging machine 1 generally moves.

According to a further advantageous characterizing feature of the invention, the retrieval area 40 is provided in addition with an abutment 42 that is capable of preventing any sample batch 4, 5 from sliding along the inclined receiving plane 41 under the effect of gravity. It is understood, however, that this abutment 42 is not obligatory, and that the reception of the sample batch 4, 5 could very well be performed directly by the operator.

The receiving plane 41 preferably exhibits a surface favoring the sliding by gravity of the sample batch 4, 5 towards the abutment 42. In practice, such a receiving plane 41 may be constituted, for example, by a ball plate or a roller plate.

In this particular embodiment, the assembly means 20 utilize a fork gripper 23 in order to grasp each pack 4, 5 of boxes to be handled. This is why the retrieval area 40 in this case is advantageously provided with a plurality of parallel pins 44, forming a rack 43. These pins 44 are designed and placed in such a way as to allow the forks 24 of the gripper 23 to pass through when the latter has been lowered directly onto the rack 43 according to a movement that is substantially parallel to the pins 44. However, the assembly is also arranged in such a way that these pins 44 retain the sample batch 4, 5 during retraction of the gripper 23 from the retrieval area 40 according to a movement that is substantially perpendicular to the pins 44.

As can be appreciated clearly in FIG. 3, the rack 43 in this illustrative embodiment is comprised of a plurality of parallel pins 44 which extend upwards substantially perpendicularly to the receiving plane 41. The spacing between these pins 44 is compatible with spacing that separates the forks 24 of the gripper 23, such that a certain relative mobility exists once these two types of element interact.

As a result, the placing of a sample batch 4, 5 onto the retrieval area 40 may take place by lowering the gripper 23 directly onto the rack 43, that is to say by causing the proximal part of the forks 24 to pass between the pins 44 according to a translational movement that is substantially perpendicular to the receiving plane 41. The body of the gripper and the distal part of the forks 24 are then positioned respectively to either side of the rack 43. The retraction of the gripper 23, for its part, takes place by translation according to a direction that is substantially perpendicular to the rack 43, that is parallel to the receiving plane 41. The retraction of the forks 24 in relation to the pins 44 causes the pack 4, 5 to be deposited on the receiving plane 41, the pins 44 are then able to play their full role as retaining means. Immediately afterwards, the same pins 44 perform another function, namely to constitute a lateral guide during sliding of the sample batch 4, 5 towards the abutment 42.

The invention claimed is:

1. A packaging machine for packing flat objects, the packaging machine comprising:
    a counting and separation device configured for forming a succession of batches, each batch comprising a selected number of the flat objects; and
    an assembly device for forming a succession of packs, each pack comprised of a particular assembly of batches;
    wherein the counting and separation device is configured for forming a sample batch to be collected, and the assembly device is configured for collecting each sample batch and for transferring the sample batch to a sample retrieval area; and
    the assembly device includes a fork gripper configured for grasping each batch of flat objects to be handled, the retrieval area includes a plurality of substantially parallel pins, forming a rack, which are configured for allowing forks of the fork gripper to pass through when the forks have been lowered directly onto the rack in a movement that is parallel to the pins, and for retaining the sample batch during retraction of the fork gripper from the sample retrieval area by a movement that is perpendicular to the pins.

2. The packaging machine according to claim 1, wherein the sample retrieval area is arranged above the counting and separation device.

3. The packaging machine according to claim 1, wherein the sample retrieval area includes a receiving plane which is inclined with respect to the horizontal.

\* \* \* \* \*